United States Patent
Reyes et al.

(10) Patent No.: US 7,880,890 B2
(45) Date of Patent: Feb. 1, 2011

(54) MEMS MICHELSON INTERFEROMETER AND METHOD OF FABRICATION

(75) Inventors: David Reyes, Boston, MA (US); E. Robert Schildkraut, Waltham, MA (US); Jinhong Kim, Brookline, MA (US)

(73) Assignee: Block Engineering, LLC, Marlborough, MA (US)

( * ) Notice: Subject to any disclaimer, the term of this patent is extended or adjusted under 35 U.S.C. 154(b) by 270 days.

(21) Appl. No.: 11/966,586

(22) Filed: Dec. 28, 2007

(65) Prior Publication Data

US 2009/0122383 A1     May 14, 2009

Related U.S. Application Data

(60) Provisional application No. 60/987,971, filed on Nov. 14, 2007.

(51) Int. Cl.
G01B 9/02 (2006.01)

(52) U.S. Cl. ........................ 356/450; 356/452

(58) Field of Classification Search .......... 356/450–456
See application file for complete search history.

(56) References Cited

U.S. PATENT DOCUMENTS

| | | | |
|---|---|---|---|
| 6,166,478 | A | 12/2000 | Yi et al. |
| 6,556,741 | B1 | 4/2003 | Fan |
| 6,600,850 | B1 | 7/2003 | Fan |
| 7,024,920 | B2 | 4/2006 | Discenzo |
| 7,061,618 | B2 * | 6/2006 | Atia et al. ............ 356/454 |
| 7,265,830 | B2 | 9/2007 | Wang |
| 7,283,242 | B2 | 10/2007 | Thornton |
| 7,710,574 | B2 * | 5/2010 | Sin et al. ............ 356/452 |
| 2002/0018385 | A1 * | 2/2002 | Flanders et al. ...... 365/215 |
| 2004/0227087 | A1 | 11/2004 | Markham et al. |
| 2005/0237538 | A1 | 10/2005 | Belleville |
| 2007/0153281 | A1 | 7/2007 | Gordon et al. |
| 2007/0245811 | A1 | 10/2007 | Discenzo |

FOREIGN PATENT DOCUMENTS

| | | |
|---|---|---|
| EP | 1 637 850 A1 | 3/2006 |
| WO | 03/069289 A1 | 8/2003 |

OTHER PUBLICATIONS

Baker, Michael S., et al., "Final Report: Compliant Thermo-Mechanical MEMS Actuators LDRD #52553," Sandia Report SAND2004-6635, Dec. 2004, pp. 1-38.

Barnes, Stephen M., et al., "Torsional Ratcheting Actuating System," Technical Proceedings of the Third International Conference on Modeling and Simulation of Microsystems, San Diego, California, Mar. 27-29, 2000, pp. 273-276.

(Continued)

*Primary Examiner*—Hwa S. A Lee
(74) *Attorney, Agent, or Firm*—Houston Eliseeva LLP (57) ABSTRACT

An interferometer system includes an optical bench and at least two mirror structures, being patterned from one or more layers on the optical bench and erected to extend substantially perpendicularly to the bench to define two interferometer arms to provide a Micro-Electro-Mechanical Systems (MEMS) interferometer. The MEMS interferometer is further implemented in a Fourier transform spectrometer, which includes a common housing containing the interferometer and a gas cell, possibly including a preconcentrator.

21 Claims, 11 Drawing Sheets

OTHER PUBLICATIONS

Kiang, Meng-Hsiung, et al., "Surface-Micromachined Electrostatic-Comb Driven Scanning Micromirrors for Barcode Scanners," Department of electrical Engineering and Computer Sciences, University of California at Berkeley, Berkeley, CA, 1996, 6 pages.

Kim, Seong-Soo, et al, "Miniaturized Mid-Infrared Sensor Technologies," Anal Bioanal Chem, 390:231-237, Springer, 2008.

Kraft, M., et al., "Hand-held High-speed Spectrometers Based on Micro-Electro-Mechanical Components," Proceedings of the Symposium on Photonics Technologies for 7th Framework Program, Wroclaw, Oct. 12-14, 2006, pp. 183-186.

Krippner, Peter, et al., "Microspectrometer System for the Near Infrared Wavelength Range based on the LIGA Technology," Micro-and Nanotechnology for Biomedical and Environmental Applications, Raymond P. Mariella, Jr., Editor, Proceedings of SPEI, vol. 3912 (2000), pp. 141-149.

Manzardo, Omar, et al., "Miniature Lamellar Grating Interferometer Based on Silicon Technology," Optics Letters, vol. 29, No. 13, Jul. 1, 2004, pp. 1437-1439.

Manzardo, Omar, et al., "Miniaturized time-scanning Fourier transform spectrometer based on silicon technology," Optics Letters, vol. 24, No. 23, Dec. 1, 1999, pp. 1705-1707.

Sandner, Thilo, et al., "Miniaturized FTIR-Spectrometer Based on Optical MEMS Translatory Actuator," MOEMS and Miniaturized Systems VI, edited by David L. Dickensheets, et al., Proc. of SPIE vol. 6466, 646602, 2007, pp. 646602-1 to 646602-12.

* cited by examiner

MEMS MICHELSON INTERFEROMETER AND METHOD OF FABRICATION

RELATED APPLICATIONS

This application claims the benefit under 35 USC 119(e) of U.S. Provisional Application No. 60/987,971, filed on Nov. 14, 2007, and is related to U.S. application Ser. No. 11/966,594, filed on an even date herewith, by the same inventors, entitled Miniature Fourier Transform Spectrometer and Method of Operation, both of which are incorporated herein by this reference in their entirety.

STATEMENT REGARDING FEDERALLY SPONSORED RESEARCH OR DEVELOPMENT

This invention was made with government support under Contract No. W911NF-06-C-0077 awarded by the U.S. Army Research Office in North Carolina. The government has certain rights in the invention.

BACKGROUND OF THE INVENTION

An interferometer generates an interference pattern when two waves of the same frequency constructively or destructively add. Generally, interferometers measure the variation of intensity at a function of path difference in the interferometer's arms. A common type of interferometer is termed a Michelson interferometer. Typically, this type of interferometer uses a monochromatic source such as a laser. Two mirrors define two arms of the interferometer with respect to a third semitransparent mirror or beam splitter. When the two paths differ by a whole number of wavelengths, for example, there is constructive interference at a detector.

Another type of interferometers is a Mach Zehnder interferometer. This interferometer uses two beam splitters and two completely reflective mirrors. The source beam is split and the two resulting waves travel along separate arms. Still another interferometer configuration is termed a Sagnac interferometer. In this configuration, two beams follow different paths around a ring, typically constructed from a series of mirrors. At the return point of the light, it exits to generate an interference pattern at the detector.

A common application for interferometers is Fourier transform spectroscopy. Time-domain measurements are made of a broadband optical signal. By modulating the path length of one of the arms of the interferometer, a spectrum can be reconstructed using a reverse Fourier transform of the temporal response of the detector. Commonly, Fourier transform spectroscopy is performed at infrared, including near infrared, wavelengths although other wavelengths stretching into the visible bands are also used.

In more detail, IR absorption spectroscopy is the basic technology used to differentiate detailed molecular structure and can be applied even when mixtures are present. Because the technique is quite mature, and used by a very large number of researchers in addition to routine process control, there are many commercially used chemical search programs for automated chemical identification and ranking. Generally, the IR absorption system offers extreme specificity, good sensitivity, and builds on established models for predicting performance using available spectral libraries of compounds.

At the same time, MicroElectroMechanical Systems (MEMS) fabrication techniques have been perfected. For example, a number of techniques have been demonstrated for the creation of out-of-plane MEMS structures. These fabrication processes require means for erecting the structures, holding them in the erected position, and doing so with adequate accuracy to achieve the required system performance. For example, Yi et al., in U.S. Pat. No. 6,166,478, has described a microelectromechanical system that includes at least two hinged flaps, each having a different amount of Permalloy or other magnetic material. The flaps are hinged at an angle to each other, and can be rotated off plane when placed in an increasing magnetic field. The flaps are raised asynchronously, at different times, due to the different amounts of Permalloy used in the flaps. As they are raised, the flaps interact with each other and become interlocked. Fan, in U.S. Pat. No. 6,556,741 and U.S. Pat. No. 6,600,850, describes torsional hinges and a notched latching mechanism for out-of-plane MEMS structures.

SUMMARY OF THE INVENTION

The present invention generally relates to the field of Micro-Electro-Mechanical Systems (MEMS) and more particularly to MEMS that include out-of-plane structures. The invention concerns the application of such structures to the implementation of an interferometer, including larger systems using the interferometer as the measurement engine.

Typical MEMS devices are fabricated and operate in one or more planes that are parallel to the substrate on which the devices are made. There are, however, applications for MEMS in which it is desirable to have out-of-plane structures. For example, many micro-optical systems require that the MEMS optical elements (lenses, mirrors, or beamsplitters), all of which can be fabricated in the plane of the substrate, be erected generally perpendicular to the substrate to allow an optical beam to pass through or reflected by each element in turn, as it would in a macroscopic, bench optical system.

In general, according to one aspect, the invention features an interferometer system. This system comprises an optical bench and at least two mirror structures, being patterned from one or more layers on the optical bench and erected to extend substantially perpendicularly to the bench to define at least one beam path.

In the preferred embodiment, the at least two mirror structures comprises three mirror structures being patterned from one or more layers on the optical bench and erected to extend substantially perpendicularly to the bench to define two interferometer arms. One of the mirror structures is a beam splitter for splitting an optical signal between the two interferometer arms. Another one of the mirror structures is a moving mirror driven by a mirror motor. The actuator is patterned from one or more layers on the optical bench. Preferably, the mirror actuator comprises an electrical motor and a linear translating drive mechanism.

Due to the MEMS implementation, a diameter of at least one of the mirror structures is less than 10 millimeters, with a diameter of at least one of the mirror structures preferably being less than 2 millimeters.

A throw distance of the moving mirror is greater than 200 micrometers to provide broadband scanning while an optical length of at least one of the beam paths is less than 100 millimeters to provide a compact device, and preferably less than 10 millimeters to as short as less than 3 millimeters.

A surface micromachined system is used in which at least one of the mirror structures comprises a spring element and upright locking element, in which the spring element mechanically biases the locking element into a locked state.

Optically reflective coatings are usually used on the mirror structures, including dielectric coatings or metal coatings.

In general, according to another aspect, the invention features a method of constructing an interferometer system. This method comprises providing an optical bench, patterning at least two mirror structures from one or more layers on the optical bench, and erecting the mirror structures to extend substantially perpendicularly to the bench to define at least one optical beam path.

The method preferably further comprises translating one of the mirror structures in a direction parallel to a surface of the optical bench to tune the interferometer system.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

MEMS Interferometer

Figure 1:
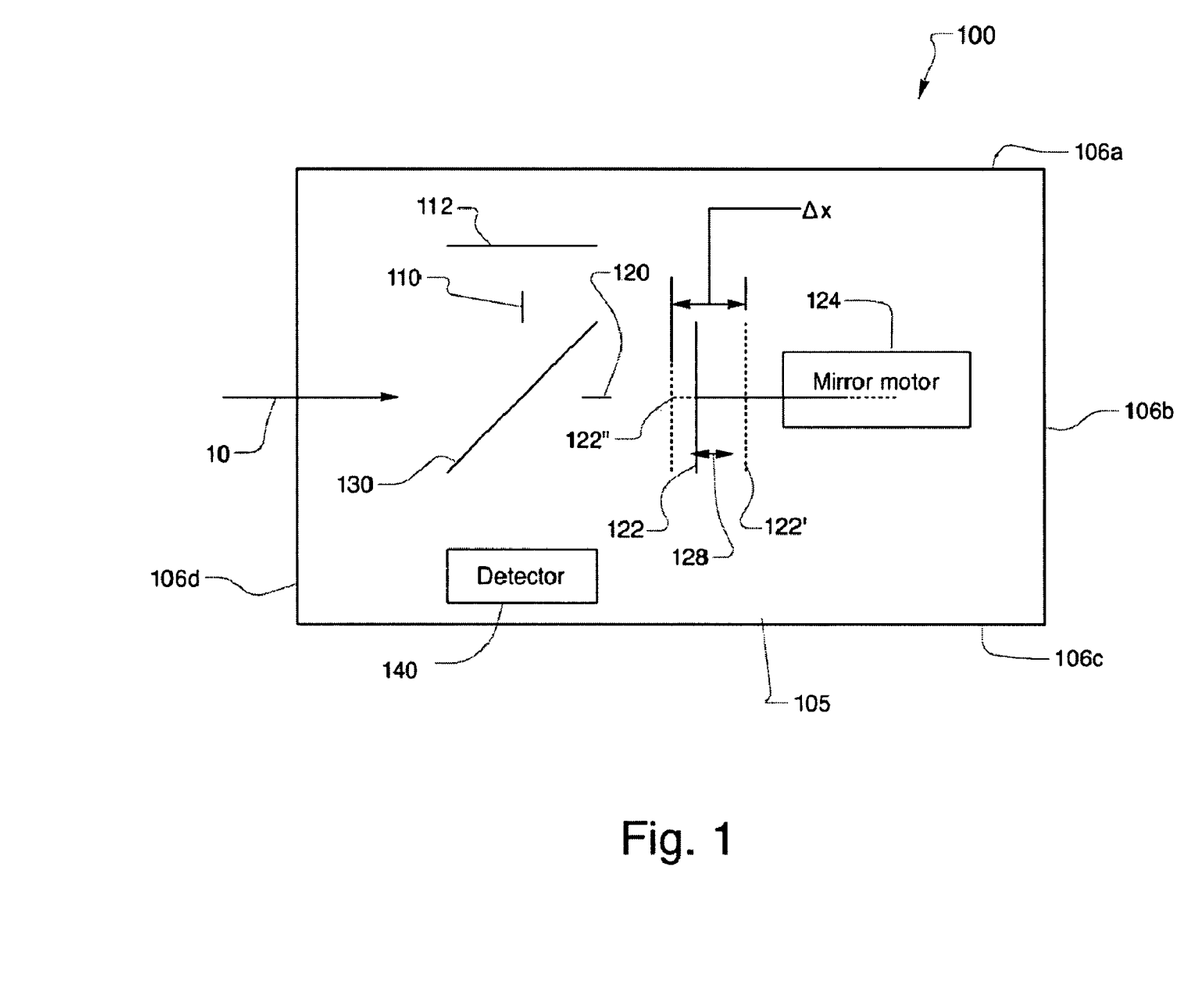
FIG. 1 is a schematic diagram of a MEMS Michelson interferometer according to the present invention.

FIG. 1 shows an interferometer system 100, which has been constructed according to the principles of the present invention. In the illustrated example, the interferometer system 100 is used to analyze the incoming light 10.

The interferometer system 100 is constructed on an optical bench 105. The optical bench is unitary piece of MEMS substrate material. Typically, the bench 105 is silicon and/or silicon nitride wafer material that has been diced by cleaving or die sawing along edges 106a, b, c, d to create the individual chips or microoptical benches 105.

The interferometer system 100 comprises two beam paths or two arms that extend parallel to a top surface of the optical bench 105: a fixed mirror arm 110 and a moving mirror arm 120. A beam splitter 130 divides the incoming light 10 between the two arms 110, 120 in the illustrated Michelson interferometer configuration.

In alternative embodiments, the mirrors and possibly beam splitter are arranged on the bench 105 in other interferometer configurations such as a Sagnac interferometer, using a ring beam path, or a Mach-Zehnder interferometer, using sample and reference beam paths.

The fixed mirror arm 110 is defined by a fixed mirror structure 112 that projects orthogonally from the top surface of the bench 105.

The moving mirror arm 120 is defined by a moving mirror structure 122 that also projects orthogonally from the top surface of the bench 105.

The moving mirror structure 122 is moved back and forth in the direction of arrow 128 between the extremes (122' and 122") of the moving mirror structure's travel. These extremes define the mirror's throw distance $\Delta x$. The moving mirror 122 is driven by a mirror actuator 124, which is an electrical motor in the preferred embodiment.

A detector 140 detects the optical signal 10 combined from the arms 110, 120 by the beamsplitter 130 in this Michelson interferometer configuration. In an alternative configuration, the detector 140 is replaced with an optical source such as a laser, specifically, a semiconductor diode laser, which is installed directly on the bench 105 in one embodiment. In an alterative embodiment, the optical signal from the semiconductor diode laser is coupled to the optical bench 105 by an optical fiber.

In still other embodiments, the optical source is a broadband source covering the wavelength range of interest for spectrometer applications. Specifically, a temperature controlled infrared radiation (IR), a near IR, optical, or ultraviolet source is used. Examples include glow bars or hot wire filaments. In some implementations, the broadband source is installed directly on the bench 105 in one embodiment. In an alterative embodiment, the light from the broadband source is coupled to the optical bench 105.

The two mirror structures 112, 122 and the beam splitter 130 are patterned from one or more layers on the optical bench 105. The mirror structures 112, 122 and beam splitter 130 are then assembled by erecting them out of the plane of the surface of the optical bench 105 to extend substantially perpendicularly to the bench 105 to define the two interferometer arms 110, 120 using microelectromechanical system (MEMS) fabrication techniques and specifically surface micromachining.

A number of approaches exist for fabricating the MEMS mirror structures 112, 122 and beam splitter 130. In some examples, these elements are fabricated by various well-known photolithographic definition and etching procedures applied to a multi-layer planar wafer comprising, typically, polysilicon and sacrificial layers on a silicon or silicon nitride substrate. In more detail, fabrication of MEMS structures is presently available as a commercial service from various foundries. For example, the Multi-User MEMS Processes (MUMPs) program at MCNC [www.mcnc.org] exists to provide low-cost, easy access to MEMS technology for all domestic organizations (academic, industrial and government) and currently features a three-layer polysilicon surface micromachining process.

Presently, the SUMMiT V fabrication process developed and provided by Sandia National Laboratories is being used. The Sandia Ultra-planar, Multi-level MEMS Technology 5

(SUMMiT VTM) Fabrication Process is a five-layer polycrystalline silicon surface micromachining process that provides one ground plane/electrical interconnect layer and four mechanical layers and utilizes chemical mechanical polishing (CMP) between deposition of the polysilicon layers to minimize print-through, thus improving planarization.

In the current embodiment, the mirror actuator is also fabricated using a MEMS process from layers on the optical bench 105. In one implementation, a MEMS motor called the Torsional Ratchet Actuator is used, which uses a combination of a ratchet mechanism and a linear translating drive mechanism. This device was generally introduced in the paper entitled Torsional Ratcheting Actuating System, Stephen M. Barnes, Samuel L. Miller, M. Steven Rodgers, Fernando Bitsie, Technical Proceedings of the Third International Conference on Modeling and Simulation of Microsystems, San Diego, Calif., Mar. 27-29, 2000, pp. 273-276. In a current embodiment, the MEMS motor is called a Thermo-Mechanical MEMS Actuator as described in "Final Report: Compliant Thermo-Mechanical MEMS Actuators LDRD #52553," by Baker, M. S., Plass, R. A., Headley, T. J. and Walraven, J. A., Sandia report SAND2004-6635, printed December 2004.

The use of MEMS fabrication technology constrains the size of the MEMS mirror structures 112, 122 and beam splitter 130. Presently, the diameters of the mirror structures are less than 10 millimeters, and even less than 2 millimeters.

Also, the throw distance Δx of the moving mirror 122 is greater than 50 micrometers and preferably greater than 200 micrometers to 500 micrometers, as in the current embodiment.

In a related matter, the optical lengths of the interferometer arms 110, 120 are less than 100 millimeters, and further less 10 millimeters. Currently the arms are small, less than 3 millimeters, or about two millimeters in length. These small distances ensure a compact system.

MEMS FT Spectrometer

Figure 2A:
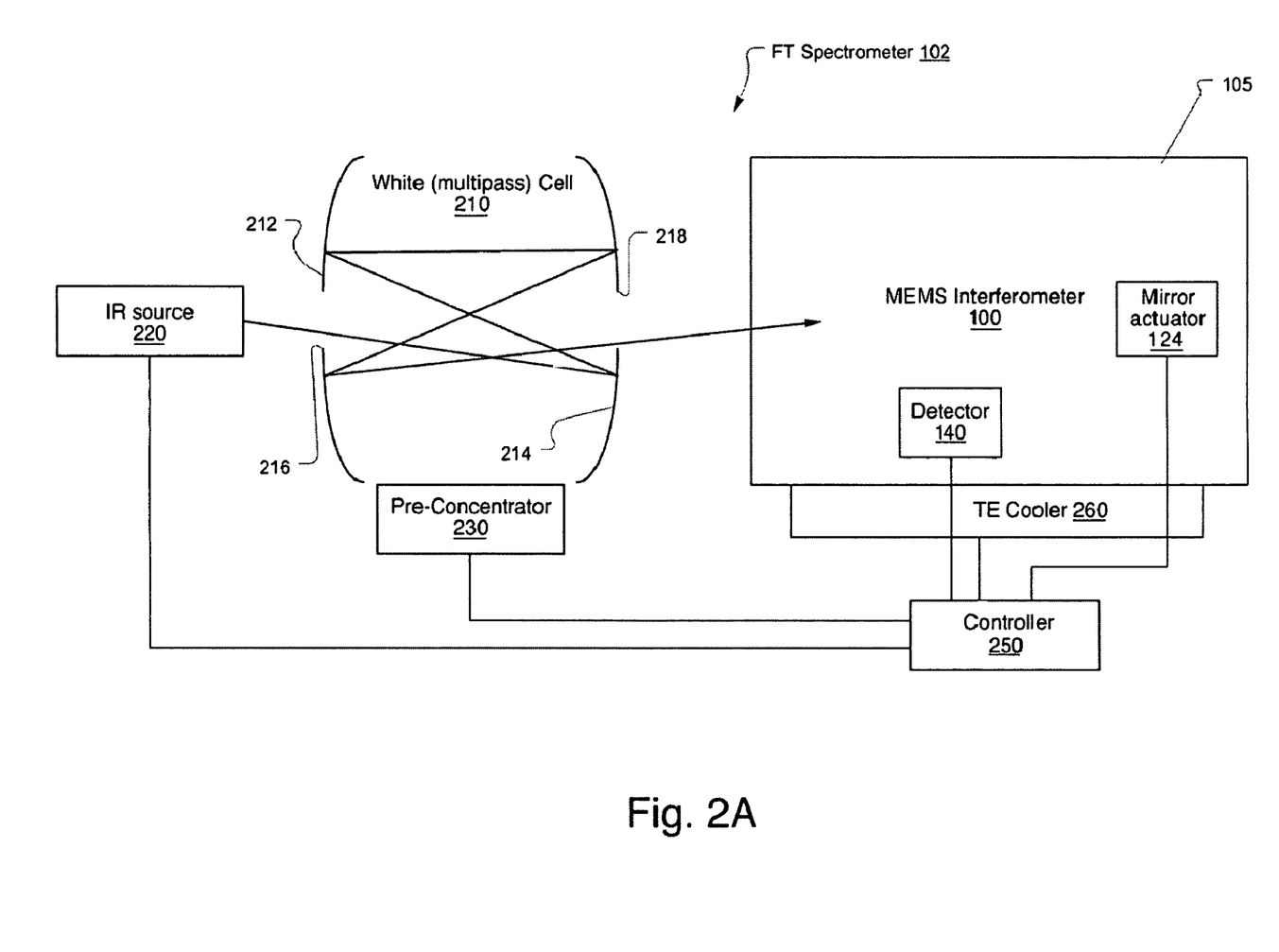
FIGS. 2A and 2B are schematic diagrams showing two embodiments of MEMS Fourier transform gas spectrometers according to the present invention.

FIG. 2A shows the MEMS interferometer system 100 deployed into a Fourier Transform (FT) gas spectrometer, which has been constructed according to the principles of the present invention. In a current example, the 2-13.5 μm spectral region is used for the detection and identification of toxic vapors.

In more detail, an optical source 220 of the FT spectrometer 102 generates an optical signal. In the preferred embodiment, the optical source 220 is a broad band IR source such as a glow bar or hot wire filament. The optical source is preferably thermally stabilized to generate a stable broadband spectrum covering the wavelength band of interest.

The optical signal generated by the source 220 is modulated by the spectral absorption characteristics of the gas held within a gas cell 210. In the preferred embodiment, the gas cell 210 is a white, multi-pass gas cell that has an effective path length of about 1 meter or greater through the ambient atmosphere/target vapor with ten (10) passes through the 10 centimeter (cm) long cell used in one specific example.

The gas cell 210 is defined by two concave mirrors 212, 214, having reflective sides opposing each other. An input port 216 allows the optical signal to enter the cell 210. An output port 218 allows that signal to be received by the detector 140.

The light exiting from the gas cell 210 is received by the MEMS interferometer 100 of the FT spectrometer 102 and specifically its beam splitter.

A controller 250 is used to control both the optical source 220 and the mirror actuator 124. The controller 250 further receives the time varying response from the detector 140 as the mirror actuator 124 moves the moveable mirror 122 through its throw distance Δx. From this information, the controller 250 performs a reverse Fourier transform on the temporal response in order to reconstruct the spectral response of the gas held in the gas cell 210, in one example.

A thermoelectric (TE) cooler or heater element 260 is used to control the temperature of the optical bench 105 of the MEMS interferometer 100. As a result, this temperature controller is also able control the temperature of the detector 140 so that it is maintained at a constant temperature.

One drawback associated with using the MEMS interferometer 100 in the FT transform spectrometer system is the limitation on the size of the optical beam. It is generally understood that the sensitivity of an FT spectrometer is related to the throughput or etendue. This characteristic is defined as the product of the area and the solid angle subtended by a limiting stop of that element. In optics, this is known as the "optical invariant."

When this throughput calculation is applied to FT spectrometers, the area of the mirrors is important to increasing sensitivity. Mirror size, however, is constrained by the MEMS fabrication process in the present invention.

As a result, in one embodiment, to improve the performance, a pre-concentrator 230 is used. This pre-concentrator 230 is controlled by the controller 250 to absorb the gas species of interest during a first stage. Typically, this is accomplished by allowing the pre-concentrator to cool, such as to ambient temperature. Once the pre-concentrator has gone through a sufficient absorption process, the controller 250 controls the pre-concentrator 230 to, for example, heat the pre-concentrator 230 in order to adsorb the absorbed gas species into the gas cell 210. This has the effect of concentrating the gas species of interest over ambient concentrations in the gas cell 210 enabling the MEMS spectrometer system 102 to detect the gas species in spite of any inherent sensitivity limitations associated with the MEMS mirrors.

Figure 2B:
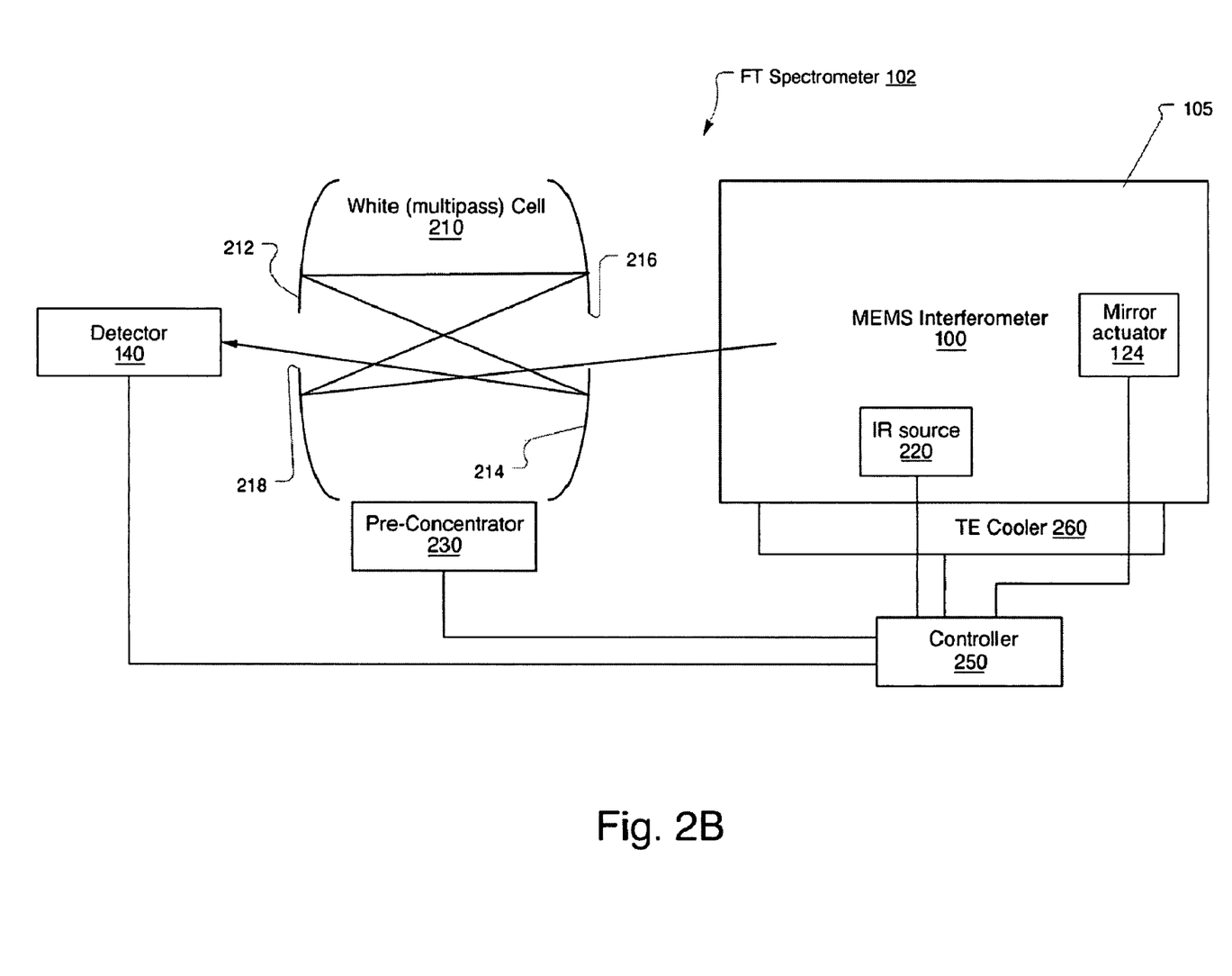

FIG. 2B illustrates an alternative embodiment of the FT spectrometer 102. In this example, the positions of the broadband or IR source 220 and the detector 140 are exchanged. Specifically, the source 220 is installed on or optically coupled to the optical bench 105 of the MEMS interferometer 100. The detector 140 is located remotely on the other side of the gas cell 210.

A thermoelectric (TE) cooler or other temperature controller 260 is used to control the temperature of the optical bench 105 of the MEMS interferometer 100.

Figure 3A:
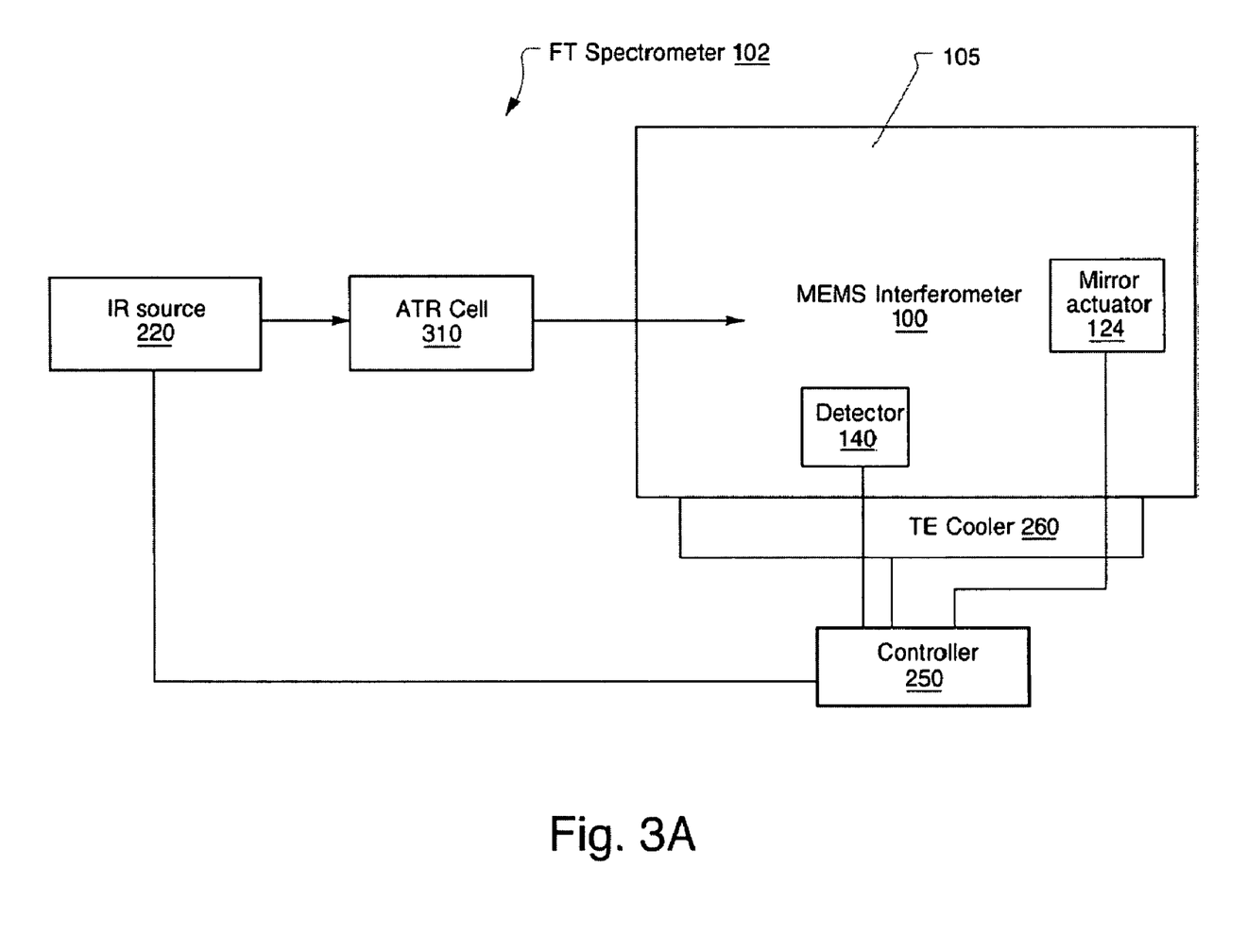
FIGS. 3A, 3B, and 3C are schematic diagrams showing three embodiments of MEMS Fourier transform ATR spectrometers according to the present invention.

FIG. 3A illustrates an alternative embodiment of the present invention. In this example, the gas cell has been replaced with an attenuated total reflection (ATR) cell 310. Attenuated total reflection technique is used as an alternative to the traditional transmission modes used in gas sensing and for spectral analysis of liquids and solids. Specifically, the optical beam is guided through a transparent crystal by total internal reflection. The electro-magnetic field of the light extends beyond the crystal surface by about a micrometer or less as an evanescent field. Samples placed in contact with the crystal, either liquid or solids, interact with the evanescent field and affect the absorption of the optical signal. In one common implementation, a diamond ATR plate is used to guide the optical signal to function as the transparent crystal.

Figure 3B:
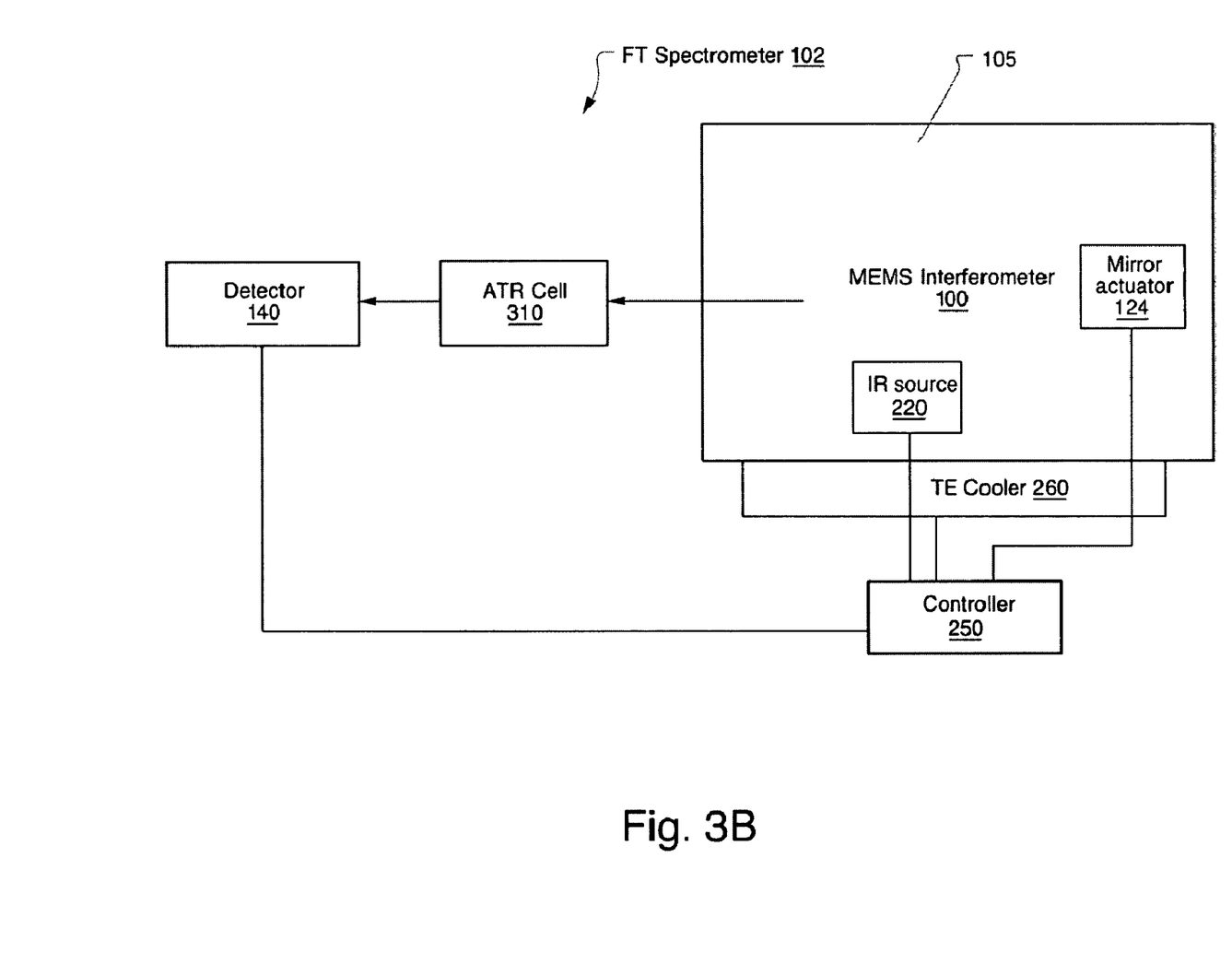

FIG. 3B illustrates an alternative configuration of the FT spectrometer in which the IR source 220 is located on the optical bench 105 and the detector 140 is located on the remote side of the ATR cell 310.

Figure 3C:
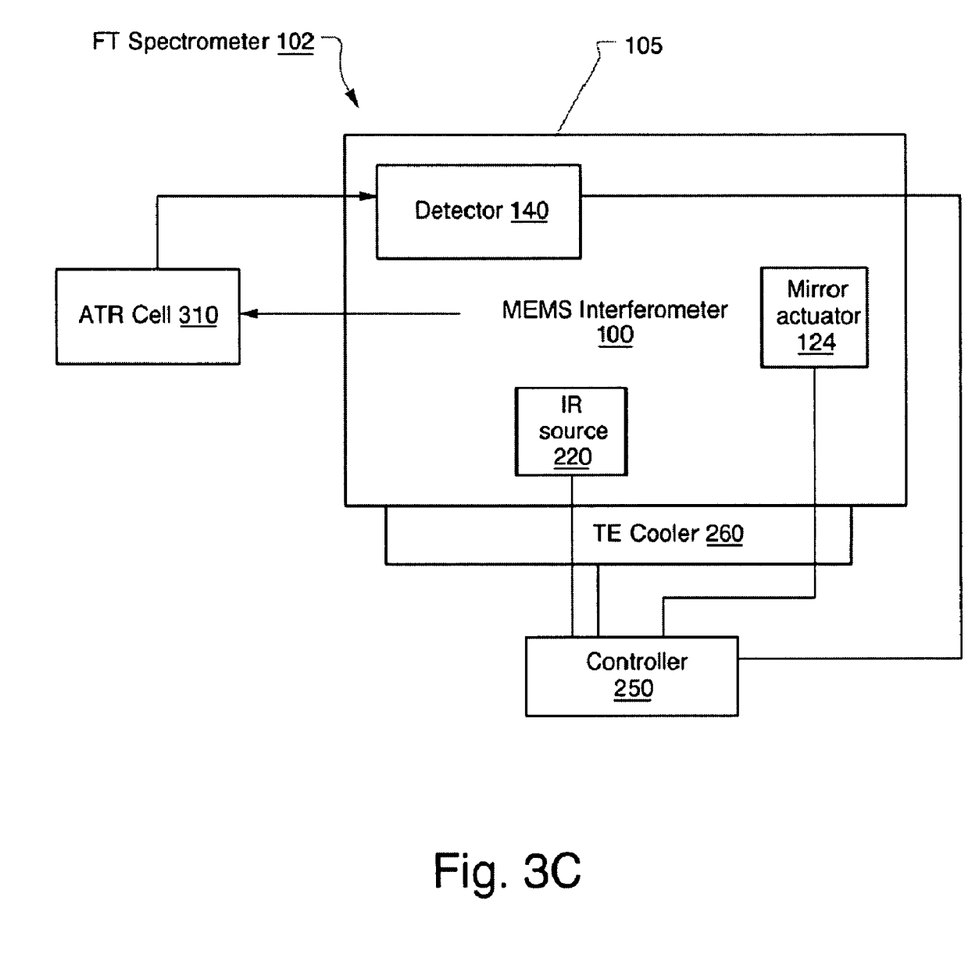

FIG. 3C illustrates still a further embodiment where both the detector 140 and the IR source 220 are located in common on the MEMS optical bench 105 or directly optically coupled to the bench. This configuration allows for the temperature control of the detector 140, source 220, and optical bench by a single thermoelectric cooler or other temperature control device 260 or other heating or cooling element.

Figure 4A:
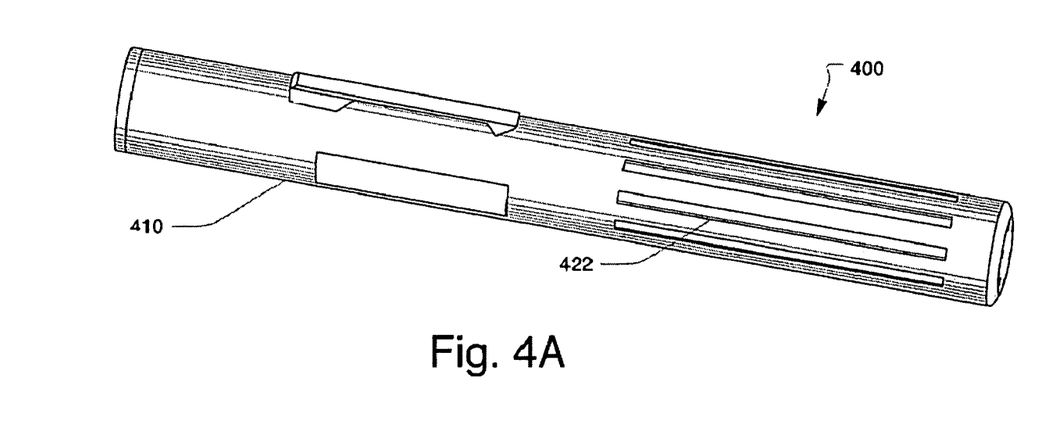
FIGS. 4A and 4B are perspective views showing a MEMS Fourier transform gas spectrometer system according to an embodiment of the present invention.

FIG. 4A is a perspective view of a gas spectrometer system constructed according to principles of the present invention. It generally comprises a housing 410. In a preferred embodiment, the housing 410 is smaller than 100 millimeters cubed in volume.

In one embodiment, the housing is less than 200 millimeters long and has a diameter of less than 20 millimeters.

Holes 422 are provided in this housing to enable the flow of gas into the housing 410.

Figure 4B:
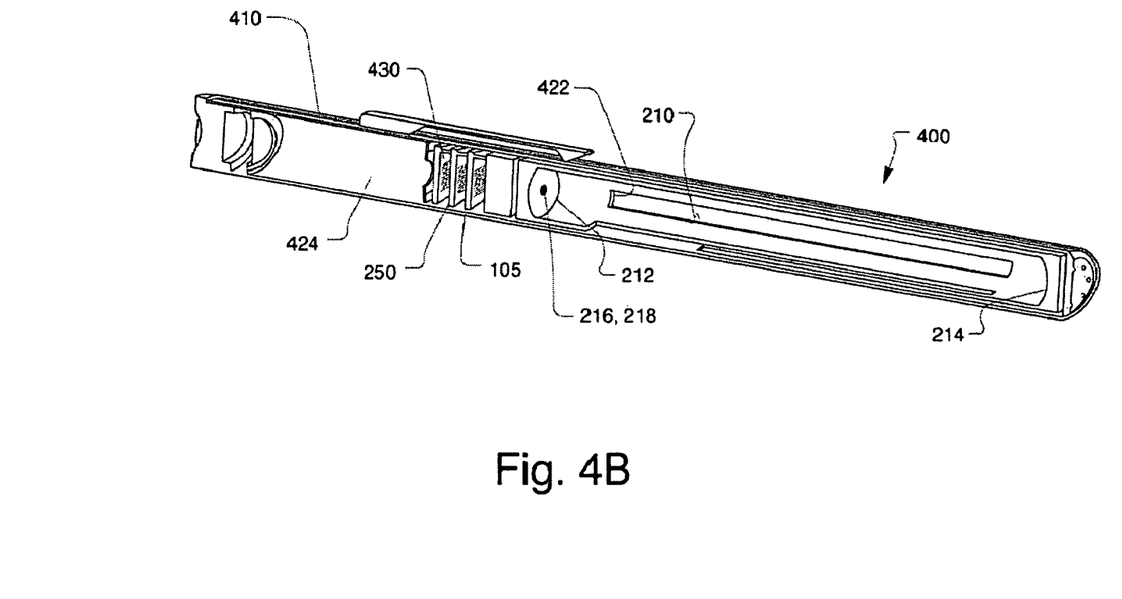

FIG. 4B is a cross-sectional view of the spectrometer system 400. Specifically, it shows the housing holes 422 allowing gas to enter a multipass gas cell 210.

The gas cell 210 is defined by two concave mirrors 212, 214. In the illustrated example, the input port and the output port are provided by a common port 216, 218 in the gas cell mirror 212.

The optical port 216, 218 allows the optical signal to communicate with the MEMS interferometer optical bench 105. Drive electronics and the controller 250 are provided on an electronics board behind the optical bench 105. Further, a battery 424 is preferably further provided within the housing 410 in order to power the spectrometer system 400. In one example, an additional electronics board 430 is included for power control and supply.

Figure 5:
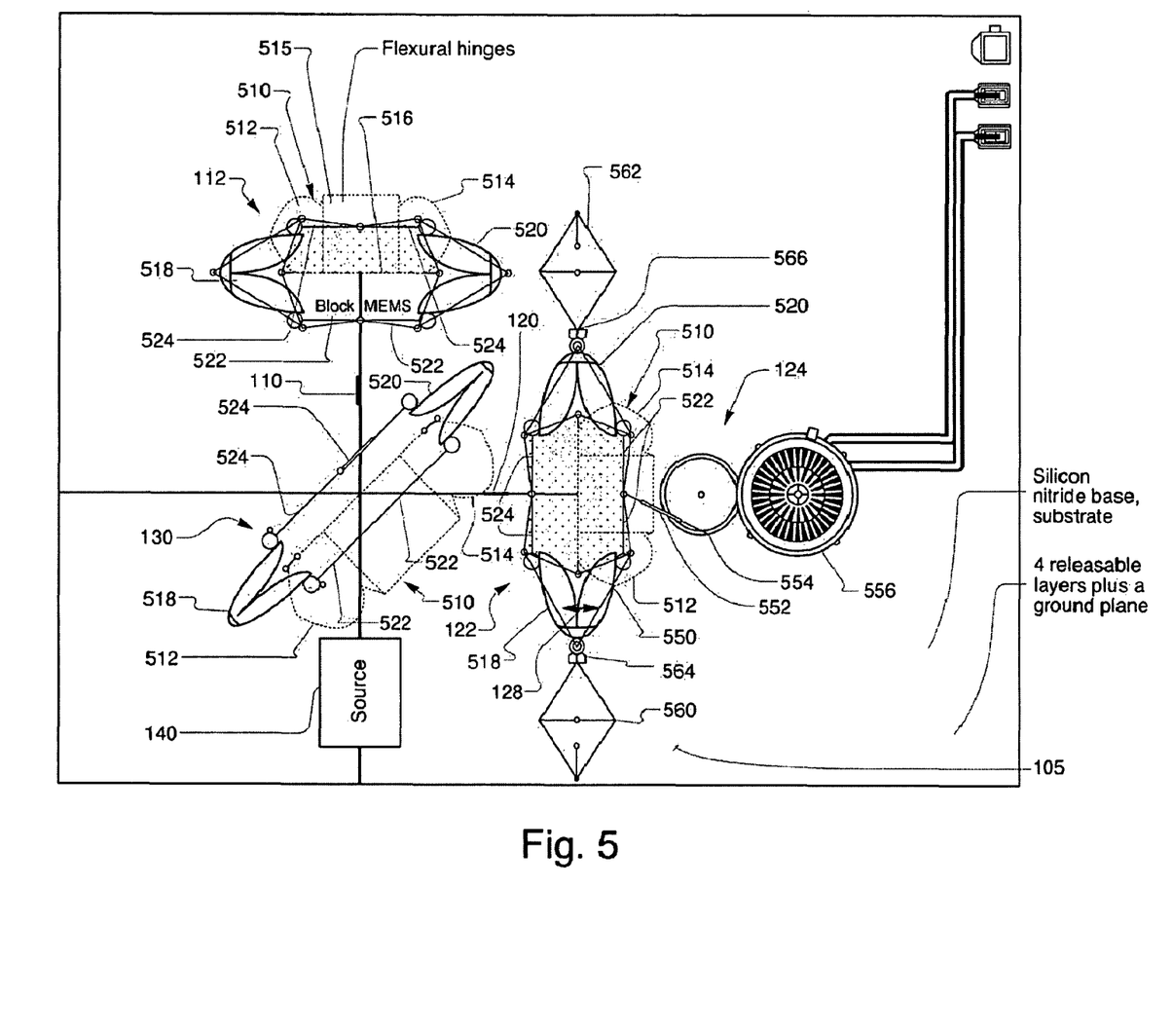
FIG. 5 is a scale diagram showing the optical bench for the MEMS Michelson interferometer according to an embodiment of the present invention.

FIG. 5 shows the optical bench 105 in an unassembled state. Specifically, each of fixed mirror 112, beam splitter 130, and the moving mirror 122 are shown lying on the optical bench before their erection to extend orthogonal to the top surface of the optical bench 105.

The erection is achieved by application of an erection force to the each of fixed mirror 112, beam splitter 130, and the moving mirror 122. There are a number of options for doing this. It can be applied manually or using a computer controlled probe. Another option is application of an electrostatic field. Still another option is to apply an acceleration force either through mechanical shock or in a centrifuge.

Each of the fixed mirror 112, beam splitter 130, and the moving mirror 122 comprise many similar components. Thus, common reference numerals have been used to highlight similarities between these elements.

In more detail, each of the fixed mirror 112, beam splitter 130, and the moving mirror 122 comprise a primary element 510 and two alignment and support brackets 518, 520. In turn, each alignment and support bracket 518, 520 has two latching spring tabs systems 522 and 524.

Each of the primary elements 510 preferably comprises three sections; an optical clear aperture section 515 and two anchor ears 512, 514. Anchor ears 512, 514 are shaped to interact with the alignment and support brackets 518, 520 and are the mechanical interface between clear aperture section 515 and the alignment and support brackets 518, 520.

Preferably, micro finite element analysis or other suitable mechanical design tools are used to design the shape of clear aperture section 515 and two anchor ears 512, 514 on either side of the clear aperture section 515 to minimize distortion or strain of the clear aperture section 515. In the current embodiment, upon assembly, the clear aperture section 515 has less than 20 nanometers (nm) RMS flatness, over 20 centimeter radius of curvature, and less than 12 min. of arc angular tilt error with respect to the plane of the optical bench.

A few differences exist between the fixed mirror 112, beam splitter 130, and the moving mirror 122.

The clear aperture section 515 of the fixed mirror 112 and the movable mirror 122 are coated to be reflective. In one example, the clear aperture sections 515 of the fixed mirror 112 and the movable mirror 122 are metal coated, such as with gold or silver. In other examples, multilayer dielectric mirror coatings are used.

On the other hand clear aperture section 515 of the beam splitter 130' is coated for partial reflectivity, preferably 50% reflectivity at the wavelength of the source 140. In some cases, this reflectivity is provided by the material/material thickness of the clear aperture section 515 of the beam splitter 130'. In other examples, thin or partial metal coatings or dielectric stack coatings having antireflective (index matching) optical characteristics are used. The clear aperture section 515 of the beam splitter 130 is also longer in its alter dimension due to its angle relative to the optical axes of the two arms 110, 120.

The moving mirror 122 differs in that it is constructed on a moving platform 550. The moving platform 550 is driven by the moving mirror actuator 124 to reciprocate back and forth in the direction of arrow 128. The moving platform 550 is constrained to move linearly, without twisting by the operation of two straight line generators 560, 562. The straight line generators are coupled to the moving platform 550 via respective compliant wrist elements 564, 566.

The moving mirror actuator 124 comprises a linkage arm 552 that couples a crank gear 554 to the moving platform 550. The crank gear 554 in turn is driving by the torsional ratcheting actuating system 556.

Figure 6:
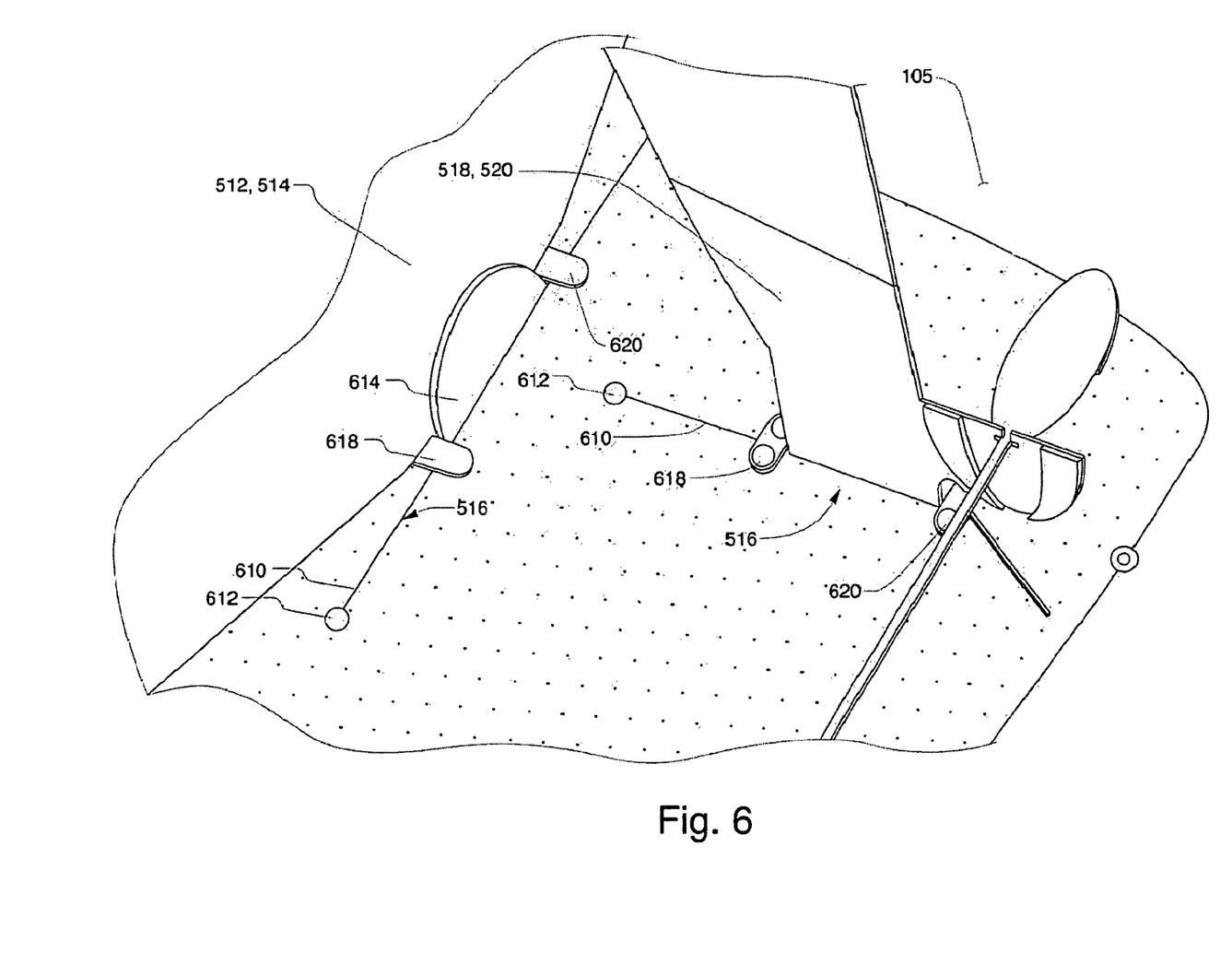
FIG. 6 is a close up perspective view of the torsion joints used in the mirror structures according to embodiments of the present invention.

FIG. 6 shows the primary element 510 attached to the optical bench substrate 105 using torsional spring hinges 516. Also shown is the attached of a support bracket 518, 520 to the optical bench 105 via separate torsional spring hinges 516. Preferably, each hinge 516 is connected to a corresponding anchor ear 512, 514 to minimize stresses on clear aperture section 515. Each torsional spring hinge 516 primarily comprises elongated torsion bars 610, attached to substrate 105 at both ends by re-enforcing interface tabs 612 and to the corresponding anchor ear 512, 514 at a taco-shaped tab 614. An axis of rotation is defined by the geometry of the torsion bar 610 to be substantially coincident with the mechanical center line of the elongated bar 610, along it longitudinal direction. This axis is designed to be substantially in the plane of the optical clear aperture section 515. To within photolithographic accuracies, the axes of rotation of both spring hinges 516 for the primary element 510 are coincident with each other.

Two staple brackets 618, 620 bridge over the elongated torsion bars 610 to improve shock survivability. The staple brackets 618, 620 are preferably disposed across torsion bars 610 to resist these additional forces and torques and to thereby maintain primary element 510 in its desired operational alignment. Preferably, staple brackets 618, 620 are disposed in close proximity to taco-shaped re-enforcing tab 614. The staple brackets 618, 620 are fabricated using standard MEMS processes wherein a release layer under staple 618, 620 and above torsion bar 610 are etched away, leaving torsion bar 610 free to rotate or twist under staple brackets 618, 620.

Torsion bars 610 are preferably balanced around the point of contact at the taco-shaped tab 614, thereby reducing twisting forces on the primary element 510 and the concomitant surface distortion. Generally, it may be noted that the available torque from the torsion bars is adjustable during the design phase; the torque is inversely related to the length of the torsion bar for a fixed torsion bar cross-section.

During fabrication, all elements of a MEMS device are etched from parallel layers; in the illustrated example the torsion bars 610 and portions of taco-shaped re-enforcing tab 614 are etched from the same layer. It will be appreciated, therefore, that an approximately 90 degree twist is imparted to each torsion bar 610 when the primary element 100 is erected to the approximately perpendicular position, illustrated.

Torsion bars 610 are typically comprised of patterned polysilicon material, which has elastic properties. Twisted torsion bars 610, therefore, will try to return to their untwisted state, acting as a torsional spring. The torque from the twisted torsion bars 610 acts to rotate, or try to rotate, primary element 510 back to its original, as-fabricated, position, i.e., lying in the plane of substrate 105.

As also shown similar torsional spring hinges 516 are used to secure the support brackets 518, 520 to the substrate optical bench 105.

Figure 7:
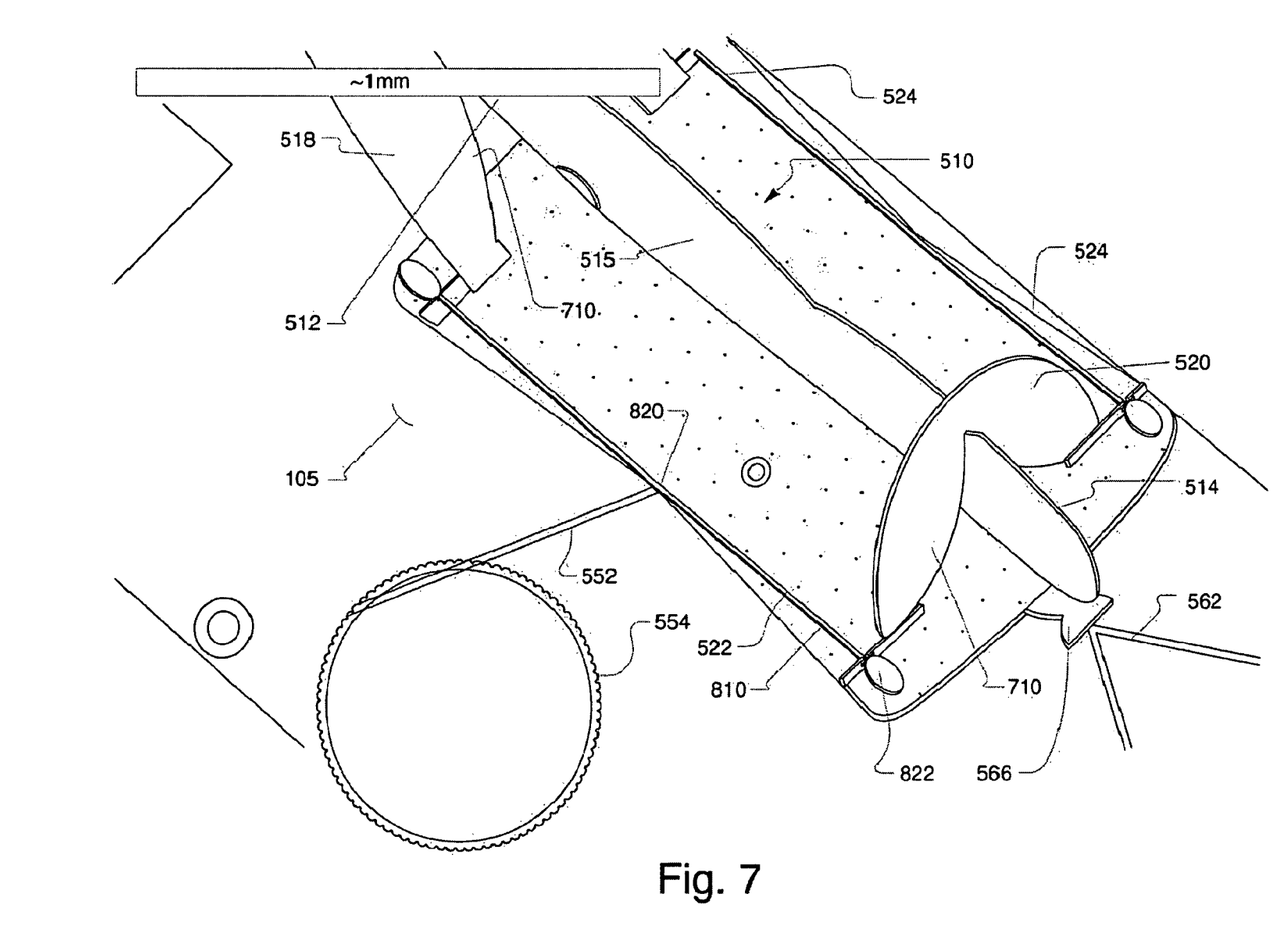
FIG. 7 is a perspective view of the MEMS mirror/beamsplitter structures according to embodiments of the present invention.

FIG. 7 also shows the erected primary element 510. The primary element 510 is held in its upright and aligned position by the support brackets 518, 520. Preferably two support brackets 518, 520 are disposed at opposing ends of primary element 510 to prevent twisting stresses from distorting clear aperture section 515.

Each support bracket 518, 520 comprises a planar sheet of polysilicon having a generally "V" shaped notch 710. The "V" notch therefore divides the support brackets 518, 520 each into two lobes. "V" notch 710 preferably narrows into a slit, the width of which is only slightly greater than the thickness of the polysilicon layer used to form the anchor ears 514, 516. At least one side of the slit 710 is substantially straight, serving as an alignment reference interface.

The primary element 510 and support brackets 518, 520 are designed such that the alignment interfaces are always in the desired plane for primary element 510, independent of the brackets' angles above substrate 105. Additionally, the spring hinges 516 of the primary element 510 are pushing the primary element 510 against the alignment interfaces so it remains in its desired position even when there are mechanical or acoustic disturbances.

The each of the support brackets 518, 520 has two latching spring tabs systems 522, 524.

Figure 8:
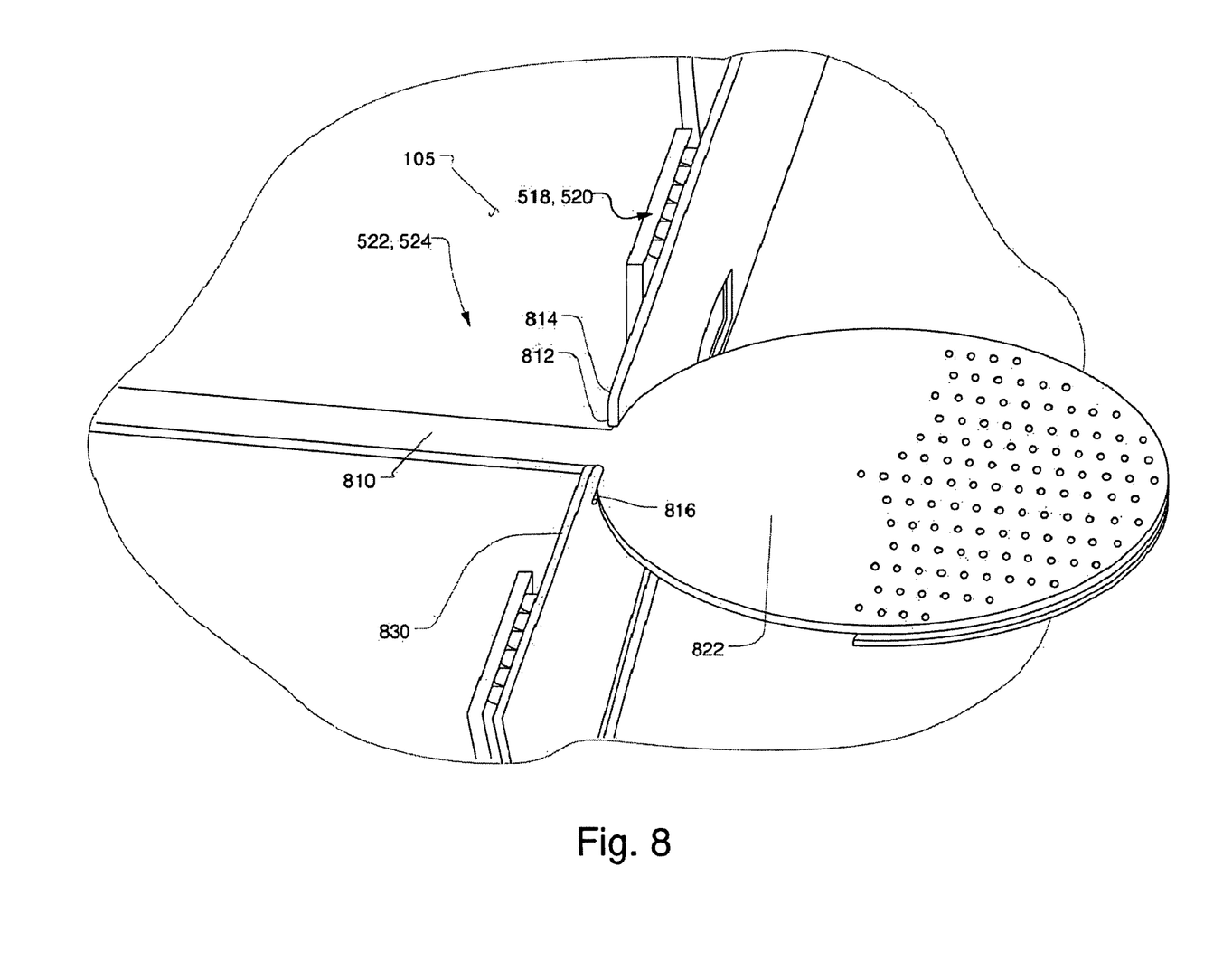
FIG. 8 is a close up perspective view of a latching system for the MEMS mirror/beamsplitter structures according to embodiments of the present invention.

FIG. 8 is a closer view of the mated spring tab 810 with notch 812 of the latching spring tabs systems 522, 524. In this view it is clear that support brackets 518, 520 comprises a planar extension 830 into which a notch 812 has been patterned created at its upper (viz., away from substrate 105) edge. The width of the notch 812 has been designed to accept latching tab 810.

Preferably, notch 812 is generally tapered, being wider at a notch mouth 814 to ease the capture of latching tab 810 and having a waist with a width matched to the width of the latching tab. Preferably further, notch 812 is terminated by a horizontal slit feature 816, wherein the height of the slit is designed to be slightly greater than the thickness of the polysilicon layer which makes up spring tab 810.

Referring back to FIG. 7, spring latching tab 810 comprises a thin elongated body, which functions as a spring, an attachment end point 820 by which the tab is affixed to substrate 50, and a relatively wider end tab 822. At fabrication, both latching tab 810 and end tab 822 lie in planes parallel to substrate 105. Preferably wider end tab 822 is fabricated above but in the general vicinity of notch 812 such that as the support bracket 518, 520 is rotated upwards, away from its as-fabricated position parallel to the substrate. Initially, notch 812 is under wider end tab 822. As it rotates towards vertical, notch 812 emerges from under end tab 822 and is generally under thin elongated body 810. The spring action of elongated body 810 drives the body 810 downward into notch 812. Notch mouth 814, captures elongated body 810 and directs it into notch 812.

When the erecting force is removed, spring hinges of the brackets 518, 520 tend to move back to their as-built position. End tab 822 holds the support bracket from rotating, locking it in the assembled position. Additional locking is provided by horizontal slit feature 816 best shown in FIG. 8. Horizontal slit feature 816 is wider than elongated body 810 and substantially narrower than end tab 822; as latch 810 is driven downward by spring hinges, the tip of end tab 822 slides into slit feature 816 creating an interlocking situation. This interlock reduces the risk of the latch releasing.

The described system provides for self-assembly in that there is no individual manipulation of the MEMS elements and where all components in the finished devices are fabricated in situ as part of the multi-layer planar pattern-and-etch process. As will be understood that a number of design principles are utilized including a) precision positioning is achieved by using force against a hard stop; b) Hard stops will not have precision positioning requirements; c) the elastic properties of a material will only be used to apply forces, not to define positions; d) non-precision positions will be held by interlocking mechanisms to prevent them from moving; e) the design will be all-compliant; that is, no micro bearings, which are subject to friction and wear, are used; and f) the sequence of elements in the layers of the as-fabricated device is designed so the elements cannot be erected out of order. That is, for example, the support brackets, being under the primary element, cannot move out of plane before the primary element.

While this invention has been particularly shown and described with references to preferred embodiments thereof, it will be understood by those skilled in the art that various changes in form and details may be made therein without departing from the scope of the invention encompassed by the appended claims.

What is claimed is:

1. An interferometer system comprising:
   an optical bench;
   at least two mirror structures patterned from one or more layers on the optical bench, said at least two mirror structures extending substantially perpendicularly to the bench to define at least one beam path;
   wherein at least one of the at least two mirror structures comprises a spring element and an upright locking element, in which the spring element mechanically biases the locking element into a locked state.

2. An interferometer system as claimed in claim 1, further comprising:
   a beamsplitter defining two arms of a Michelson interferometer extending between the beamsplitter and the at least two mirror structures.

3. An interferometer system as claimed in claim 2, wherein the beamsplitter is patterned from one or more layers on the optical bench.

4. An interferometer system as claimed in claim 3, wherein one of the at least two mirror structures is a moving mirror driven by a mirror actuator.

5. An interferometer system as claimed in claim 4, wherein the mirror actuator is patterned from one or more layers on the optical bench.

6. An interferometer system as claimed in claim 4, wherein the mirror actuator comprises an electrical motor and a linear translating drive mechanism.

7. An interferometer system as claimed in claim 4, wherein a throw distance of the moving mirror is greater than 200 micrometers.

8. An interferometer system as claimed in claim 2, further comprising an optically reflective coating on the at least two mirror structures.

9. An interferometer system as claimed in claim 8, wherein the optically reflective coating comprises a dielectric coating.

10. An interferometer system as claimed in claim 9, wherein the optically reflective coating comprises a metal coating.

11. An interferometer system as claimed in claim 2, wherein a diameter of at least one of the at least two mirror structures is less than 10 millimeters.

12. An interferometer system as claimed in claim 2, wherein a diameter of at least one of the at least two mirror structures is less than 2 millimeters.

13. An interferometer system as claimed in claim 2, wherein an optical length of at least one of the beam paths is less than 100 millimeters.

14. An interferometer system as claimed in claim 2, wherein an optical length of at least one of the beam paths is less than 10 millimeters.

15. An interferometer system as claimed in claim 2, wherein an optical length of at least one of the beam paths is less than 3 millimeters.

16. An interferometer system as claimed in claim 1, further comprising torsion hinges that connect the each of the two mirror structures to the bench.

17. An interferometer system as claimed in claim 1, wherein each of the two mirror structures comprises a primary element on which a mirror is formed and at least one support bracket that holds the primary element substantially perpendicularly to the bench.

18. An interferometer system as claimed in claim 17, further comprising torsion hinges that connect the primary element and the support bracket to the bench.

19. An interferometer system as claimed in claim 17, further comprising a upright lock that locks a primary element in an upright position.

20. An interferometer system as claimed in claim 1, further comprising a locking system for locking each of the mirror structures in an upright position above the bench.

21. An interferometer system as claimed in claim 20, wherein the locking system prevents the mirror structures from rotating to lay on the bench.

\* \* \* \* \*